United States Patent
Bösterling et al.

(10) Patent No.: US 8,840,036 B2
(45) Date of Patent: Sep. 23, 2014

(54) SCREW ANCHOR FOR RAIL ATTACHMENTS

(75) Inventors: Winfried Bösterling, Neuenrade (DE); Dirk Vorderbrück, Werdohl (DE)

(73) Assignee: Vossloh Werke GmbH, Werdohl (DE)

( * ) Notice: Subject to any disclaimer, the term of this patent is extended or adjusted under 35 U.S.C. 154(b) by 95 days.

(21) Appl. No.: 13/515,027

(22) PCT Filed: Dec. 8, 2010

(86) PCT No.: PCT/EP2010/069160
§ 371 (c)(1),
(2), (4) Date: Aug. 9, 2012

(87) PCT Pub. No.: WO2011/070060
PCT Pub. Date: Jun. 16, 2011

(65) Prior Publication Data
US 2012/0298765 A1    Nov. 29, 2012

(30) Foreign Application Priority Data
Dec. 9, 2009  (EP) .................................... 09178497

(51) Int. Cl.
*E01B 9/14* (2006.01)
*E01B 9/18* (2006.01)
*F16B 13/02* (2006.01)

(52) U.S. Cl.
CPC .. *E01B 9/18* (2013.01); *F16B 13/02* (2013.01)
USPC ...................................................... 238/377

(58) Field of Classification Search
CPC ........... E01B 9/14; E01B 9/18; F16B 43/001; F16B 13/124; F16B 5/0258; F16B 33/004; F16B 13/0841; F16B 19/008
USPC ............ 238/370, 371, 373, 374, 377; 411/22, 411/360, 392, 431, 542, 16, 44, 49, 51, 63, 411/65, 71, 72, 80.6, 60.1, 15
See application file for complete search history.

(56) References Cited

U.S. PATENT DOCUMENTS

| | | | | |
|---|---|---|---|---|
| 1,248,007 A | * | 11/1917 | Pleister | 411/63 |
| 6,481,943 B2 | * | 11/2002 | Coudrais et al. | 411/55 |
| 2009/0206558 A1 | * | 8/2009 | Nameki | 277/644 |

FOREIGN PATENT DOCUMENTS

| | | |
|---|---|---|
| DE | 8706556 U1 | 8/1987 |
| DE | 19845696 A1 | 4/2000 |
| FR | 2105593 A5 | 4/1972 |

* cited by examiner

*Primary Examiner* — Mark Le
(74) *Attorney, Agent, or Firm* — Scott R. Cox

(57) ABSTRACT

A screw anchor for concrete attachment in a railway sleeper and to a force-fit connection using a rail screw containing a threaded section with external threads disposed on an exterior of the screw anchor and internal threads disposed in the screw anchor; and an upper partial section without external threads which is disposed in a mounted state close to an anchor opening. The screw anchor utilizes material with high elasticity arranged in the upper partial section, wherein this material, when in a mounted state, forms an elevation which extends in an upward direction over an upper side of an end surface of the upper partial section and reduces a free opening section of the inner chamber of the upper partial section.

20 Claims, 5 Drawing Sheets

SCREW ANCHOR FOR RAIL ATTACHMENTS

FIELD OF THE INVENTION

The invention relates to a screw anchor for the concrete attachment in a railroad tie or non-ballasted track and the force-fit connection by means of a rail screw according to the preamble of claim 1. Moreover, the invention relates to a railroad tie or non-ballasted track with at least one screw anchor according to the invention and a corresponding rail screw.

PRIOR ART

Screw anchors for the concrete attachment in a railroad tie are used in railway engineering for connecting rail to tie. In such an arrangement, the rail attachment is connected to the tie by means of rail screws. Screw anchors often consist of plastic and can be cast into a concrete tie or a non-ballasted track during manufacture. One reason for providing an anchor made of plastic is because the rail screw should be electrically insulated against the tie.

However, the disadvantage of pairing construction elements of different materials such as screw anchors made of plastic and railroad ties made of concrete is that these materials possess different thermal expansions so that, owing to the greater thermal expansion of the plastic material conventionally used for anchors compared to that of concrete, it can lead, on the one hand, to fissures forming between anchors and the surrounding concrete of the tie but also to high radial stresses simultaneously occurring at higher temperatures in the anchor and surrounding concrete, which can even lead to radial cracks in the concrete. Owing to the tolerance state between screw and anchor, there is generally an air gap there into which water, sand and particles of dirt can penetrate. The electrical resistance of the attachment system is severely reduced particularly when water penetrates, and the ever more stringent technical requirements of signaling engineering can no longer be met. On the other hand, frozen water in winter leads to increased radial stresses.

A screw anchor is known from the German utility model 87 06 556, in the cavity of which a washer is disposed in an annular groove. The washer abuts with a sealing lip on the outer circumference of the screwed-in tie screw and prevents moisture penetrating beyond the plane of the washer.

DESCRIPTION

The object of the invention is to propose a screw anchor for the concrete attachment in a railroad tie and a railroad tie or non-ballasted track with at least one such screw anchor with improved operating safety. This object is achieved by a screw anchor with the features of claim 1 and a railroad tie or non-ballasted track with the features of claim 9. Preferred embodiments of the invention follow from the other claims.

According to the invention, a screw anchor for the concrete attachment in a railroad tie or non-ballasted track and the force-fit connection by means of a rail screw comprises a threaded section with external threads disposed on the exterior of the screw anchor and internal threads disposed inside the screw anchor. Furthermore, the screw anchor comprises an upper partial section without external threads which is disposed in the mounted state close to the anchor opening. The screw anchor is characterized in that a material with high elasticity is disposed in the upper partial section, said material, when in the mounted state, in forming a swelling elevation which extends in the upward direction over the plane of the anchor opening and reducing the free opening of the inner chamber of the upper partial section.

Thus, the material with high elasticity is not only disposed in the inside of the anchor opening in order to seal a tolerance-required gap between tie screw and anchor but extends in an upward direction over the plane of the anchor opening, whereby the material with high elasticity extends in an upward direction over the upper side of the tie with the end upper side of the partial section of the anchor flush with the upper side of the tie. In this way, a barrier is created which prevents water situated on the upper side of the tie from being able to flow into the anchor opening. In contrast to DE-U-87 06 556, where the washer is located actually below the anchor opening in the anchor cavity, the tie screw is thus prevented from being wetted with water in a very effective way.

According to a preferred embodiment of the invention, the material with high elasticity is a separate component which is attached to the upper partial section. Thus, the material with high elasticity can be a washer, which is connected in a suitable manner to the upper partial section such as, for example, bonded or welded to it. However, it is preferable that the separate component has a dovetail-shaped lug, which engages positively in an annular groove on the upper partial section. In this way, the screw anchor is already prefabricated as a pre-mounted construction unit, and an additional manufacturing step for creating a force-fit connection between the separate component with high elasticity and the upper partial section is redundant. Due to the high elasticity of the separate component, a dovetail-shaped lug can be selected even in the case of an annular groove as the material is sufficiently compressible to be inserted into such a groove, expand again once inside and be held in the groove with a positive fit.

According to an alternative embodiment, the separate component is fitted on the upper partial section. In this configuration, the material with high elasticity provided as a separate component can be widened and fitted as a sleeve onto the upper partial section, and remains frictionally engaged through its own elasticity, which produces a recoil force in a radial direction.

According to an alternative preferred embodiment, the material with high elasticity is extruded on the upper partial section. In this way, the assembly time and effort can be further reduced although higher investment expenditure is required for a 2-component injection molding method, which is however justified in mass-produced products such as screw anchors with reduced pre-assembly time and effort.

The external thread is preferably a round thread, which with regard to the force-fit has proved to be very advantageous in radial stresses between anchor and concrete material.

According to a preferred embodiment, the screw anchor further comprises at least one positive-fit element provided longitudinally on the outside of the screw anchor, preferably in the form of several ridges. Such positive-fit elements are used to prevent an undesired distortion of the screw anchor relative to the concrete tie and contribute towards the functional safety of the screw anchor according to the invention.

Preferably, the material with high elasticity is additionally disposed at least in regions as a flexible sheathing on the external circumference of the upper partial section. This measure possesses the advantage that crack formation around the upper partial section of the screw anchor can be reduced. On the one hand, stresses can occur due to thermal expansion which can lead to crack formation in the concrete; on the other hand, cracks can also occur due to the edge area being overloaded as a consequence of the horizontal forces introduced from the rail into the anchor via the tie screw.

The railroad tie or non-ballasted track according to the invention with at least one screw anchor according to the invention is designed so that the engagement of force between tie screw and anchor is displaced to the lower anchor area and correspondingly also in the lower area of the tie or non-ballasted track. This allows the stress to be reduced. According to a first alternative, the railroad tie or non-ballasted track comprises a tie screw for this purpose, which possesses a cylindrically-shaped section having an external thread, the screw anchor having a conically-shaped region widening towards the insertion opening. In this way, the engagement between the thread of the tie screw and the screw anchor is displaced to the lower region of the anchor, i.e. into the lower anchor region, which is further away from the insertion opening. Alternatively, it is also possible to design the tie screw such that it has a first and a second cylindrical section. The first cylindrical section has a larger minor diameter than the second cylindrical section and lies closer to the screw head than the second cylindrical section. As only the second cylindrical section has an external thread at least in regions, the engagement of force between tie screw and screw anchor is likewise displaced to the lower anchor region and thus also into the lower region of the tie or non-ballasted track. In this arrangement, the minor diameter means that diameter which is defined by the deepest thread grooves.

A third possibility consists in influencing the force engagement by configuring the anchor thread, e.g., by providing different anchor threads in the upper and in the lower anchor region to the effect that the force engagement is displaced to the lower anchor region.

SHORT DESCRIPTION OF THE DRAWINGS

Purely by way of example, further features of the invention will emerge from the following description of embodiments which are shown in the accompanying drawings, in which:

FIG. 4 shows a screw anchor according to the invention with rail screw screwed in.

WAYS OF EXECUTING THE INVENTION

Figure 1:
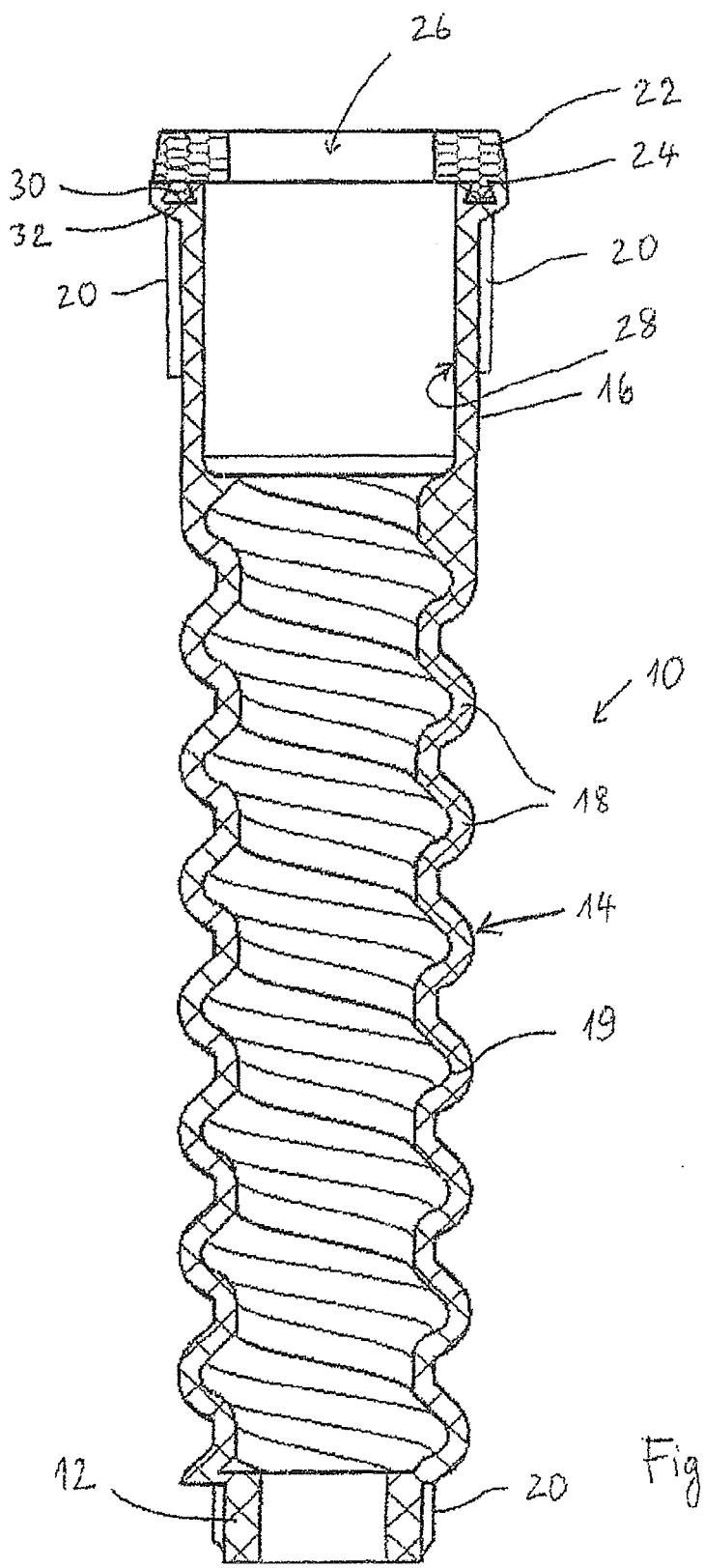
FIG. 1 is a first embodiment of a screw anchor according to the invention.

The screw anchor 10 represented in FIG. 1 is made from plastic material and is formed of several sections. The first of these is a lower partial section 12 with an essentially cylindrical shape, a threaded section 14 and an upper partial section 16. There are numerous threads 18 in the region of the threaded section 14, said threads being provided as round threads in the region of the external thread. There is an internal thread 19 in the inside of the threaded section 14, which can also be executed as a round thread but can differ from the external thread 18 in terms of thread flank and thread pitch.

The upper partial section 16 is executed essentially in a cylindrical shape and constructed integrally with the threaded section 14 as well as the lower partial section 12. Positive fit elements in the shape of ribs 20 running longitudinally to the screw anchor can be provided on the external circumference of the lower partial section 12 and/or on the external circumference of the upper partial section 16, said elements preventing the screw anchor from radially distorting relative to the surrounding concrete material after the screw anchor has been embedded with the concrete mass of the railroad tie or non-ballasted track.

The screw anchor illustrated in FIG. 1 is provided with a sealing element 22, which extends in an upward direction from the upper face 24 of the upper partial section 16. When the face 24 finishes flush with the upper side of a railroad tie, the sealing element 22 thus extends in an upward direction over the upper side of the tie.

In addition, the sealing element 22 narrows the opening 26 of the screw anchor so that the sealing element 22 elastically abuts the rail screw after screwing in a rail screw.

The extending of the sealing element 22 can be seen from the section view of FIG. 1, which makes it clear that the sealing element 22 extends into the clear opening width of the upper partial section 16 so that the opening 26 has a smaller diameter than the cylindrical internal wall 28 of the upper partial section 16.

In addition, it can be seen from FIG. 1 that the sealing element 22 has a dovetail-shaped annular ridge 30 which positively engages in a dovetail-shaped annular groove 32 in an upper flange section of the upper partial section 16.

The sealing element 22 is manufactured from a material with high elasticity and thus also high deformability so that, when screwing the rail screw into the screw anchor, it can fit the external contour of the screw and abut it. Furthermore, the sealing element 22 extends beyond the upper side of the front face 24 and can thus not only stop moisture and dirt from penetrating the screw anchor with inserted rail screw but even serves as an upstream barrier for water collected on the tie surface.

Figure 2:
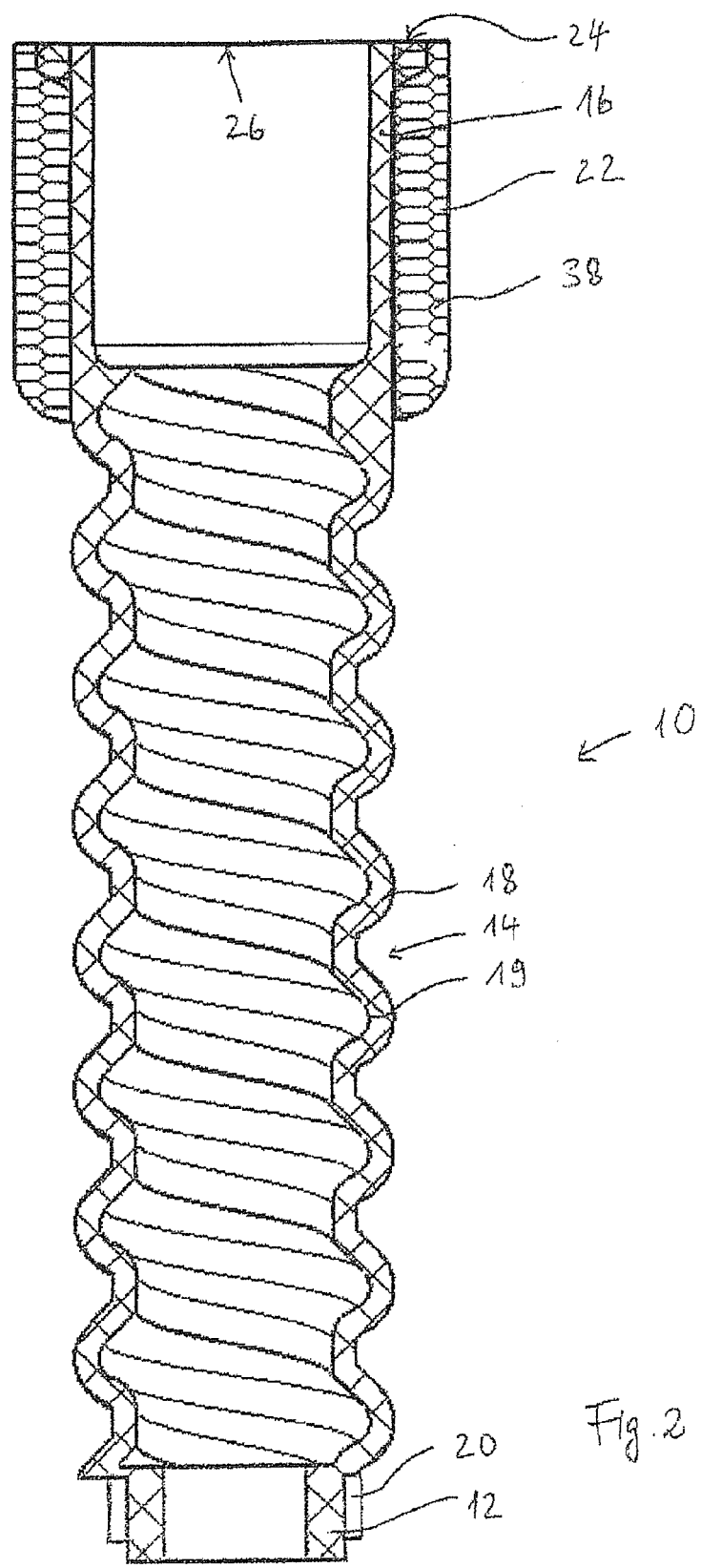
FIG. 2 is a second embodiment of a screw anchor according to the invention.

The embodiment shown in FIG. 2 corresponds essentially to that according to FIG. 1 but differs in the configuration of the sealing element 22. In this arrangement, the sealing element extends to the upper edge of the end surface 24 of the upper partial section of the screw anchor and has an opening 26 whose cross-section corresponds to that of the external wall of the upper partial section. In addition, however, the sealing element shown in FIG. 2 has a cylindrical skirt 38 that abuts the external circumference of the upper partial section. In this arrangement, the cylindrical skirt is constructed integrally with the sealing element 22 and is also manufactured from a material with high elasticity. The advantage of the cylindrical skirt 38 provided on the external circumference consists therein that it can compensate for the inevitable contractions occurring in a concrete tie and can assist in preventing radial stresses accompanied by potential radial cracks emanating from the anchor. Furthermore, the sealing element 22 arches itself upwards under radial pressure and then forms an upstream barrier for water collected on the upper side of the tie or non-ballasted track.

The sealing element shown in FIG. 2 can be attached in different ways. Firstly, a positive-fit connection as shown in FIG. 1 can be provided between the upper partial section of the anchor and the sealing element. Alternatively, it is also possible to attach the sealing element by widening the elastic, cylindrical skirt 38 and fitting it onto the upper partial section of the screw anchor where said skirt creates through its elasticity a sufficiently loadbearing, friction-fit connection with the upper partial section of the screw anchor.

Alternatively, it is possible both in the embodiment shown in FIG. 2 and that shown in FIG. 1 for the sealing element 22 to be extruded when manufacturing the screw anchor, for which the application of a known 2-component injection molding technique is required.

The solution shown in FIG. 2 with sealing element attached as a separate component or extruded sealing element also offers the possibility not only to seal off the opening section between rail screw and anchor but to extend itself beyond the upper edge of the concrete tie and thereby to provide an upstream barrier for water on the concrete tie.

Figure 3:
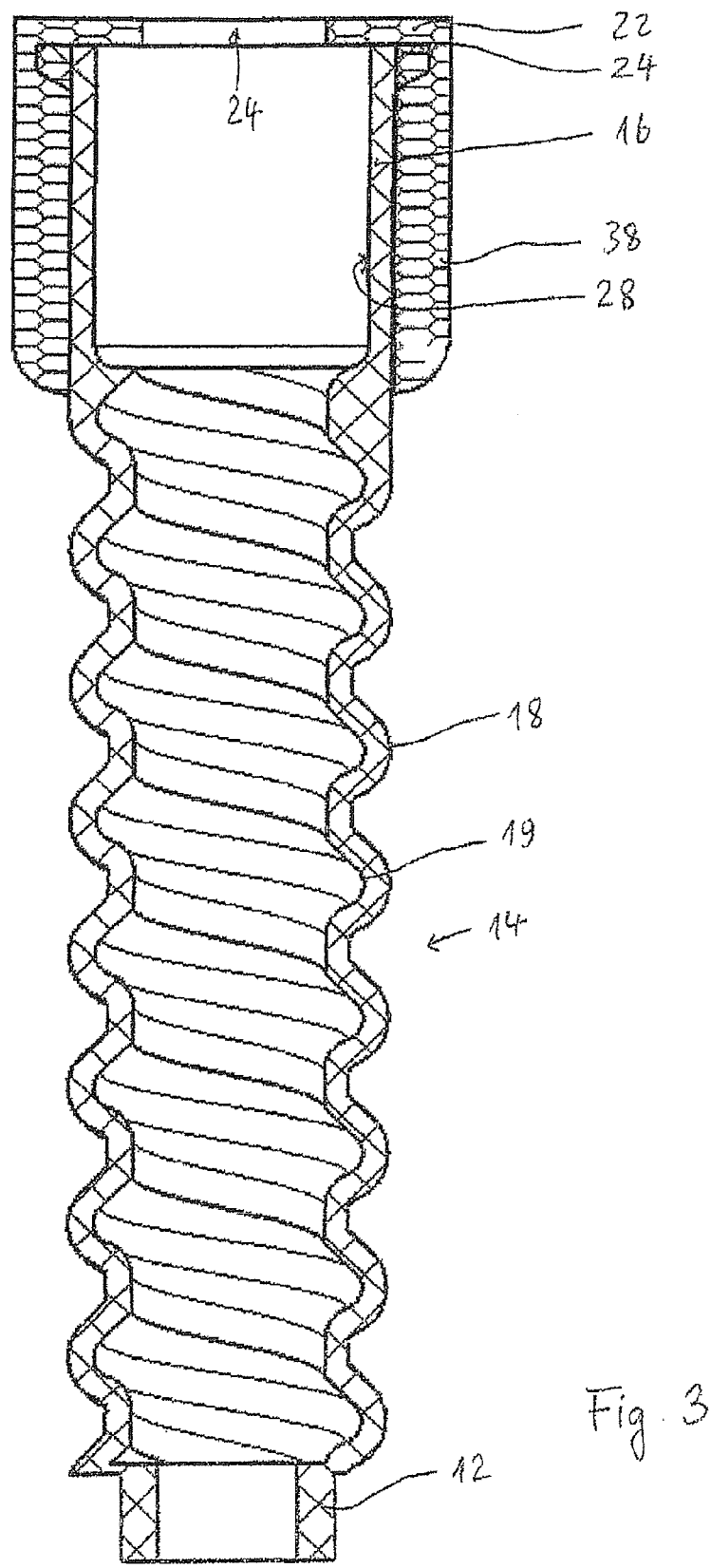
FIG. 3 is a third embodiment of a screw anchor according to the invention.

The embodiment shown in FIG. 3 combines features of the embodiments already mentioned in FIGS. 1 and 2. With regard to the embodiment according to FIG. 2, there are similarities with regard to the provision of a cylindrical skirt 38, which is configured integrally with the sealing element 22. The conformity with the embodiment according to FIG. 1 exists in the opening cross-section 24, which is smaller than the cylindrical internal wall 28 of the upper partial section 16. Furthermore, the sealing element extends in an upward direction beyond the face 24 and thus, even when the sealing element is not yet in the compressed state and when inserting the screw anchor, already forms the desired upstream barrier with the face 24 flush with the upper edge of a railroad tie or non-ballasted track, said barrier intended to prevent or at least reduce water or foreign particles from penetrating the anchor opening.

In the above-mentioned embodiments according to FIGS. 1, 2 and 3, the screw anchor 10 has an essentially cylindrically-shaped external shape in each case. The embodiment according to FIG. 4 differs from these, whereby the section 16 of the screw anchor does not possess a cylindrical shape, rather it is conically widened towards the opening 26. The sealing element 22 shown in FIG. 4 corresponds essentially to that according to FIG. 3, whereby it can be seen that a swelling 40 is formed by the elastic deformation of the opening 26 in the region of the screw shank, said swelling annularly surrounding the screw shank and extending in an upward direction.

The screw 50 has a screw head 52 with a square 54 and a cylindrical section 56 with an external thread 58. In the section 14 of the anchor, the external thread 58 is engaged with the internal thread 19 of the anchor whereas the screw thread 58 comes into contact with the internal wall of the anchor only very slightly or not at all in the conically widening section 16 of the anchor 10. In this way, the force engagement between rail screw and the surrounding anchor is displaced into the deeper anchor region 14 in order to reduce the stresses near the surface in the tie region or in the region of the non-ballasted track.

Figure 4:
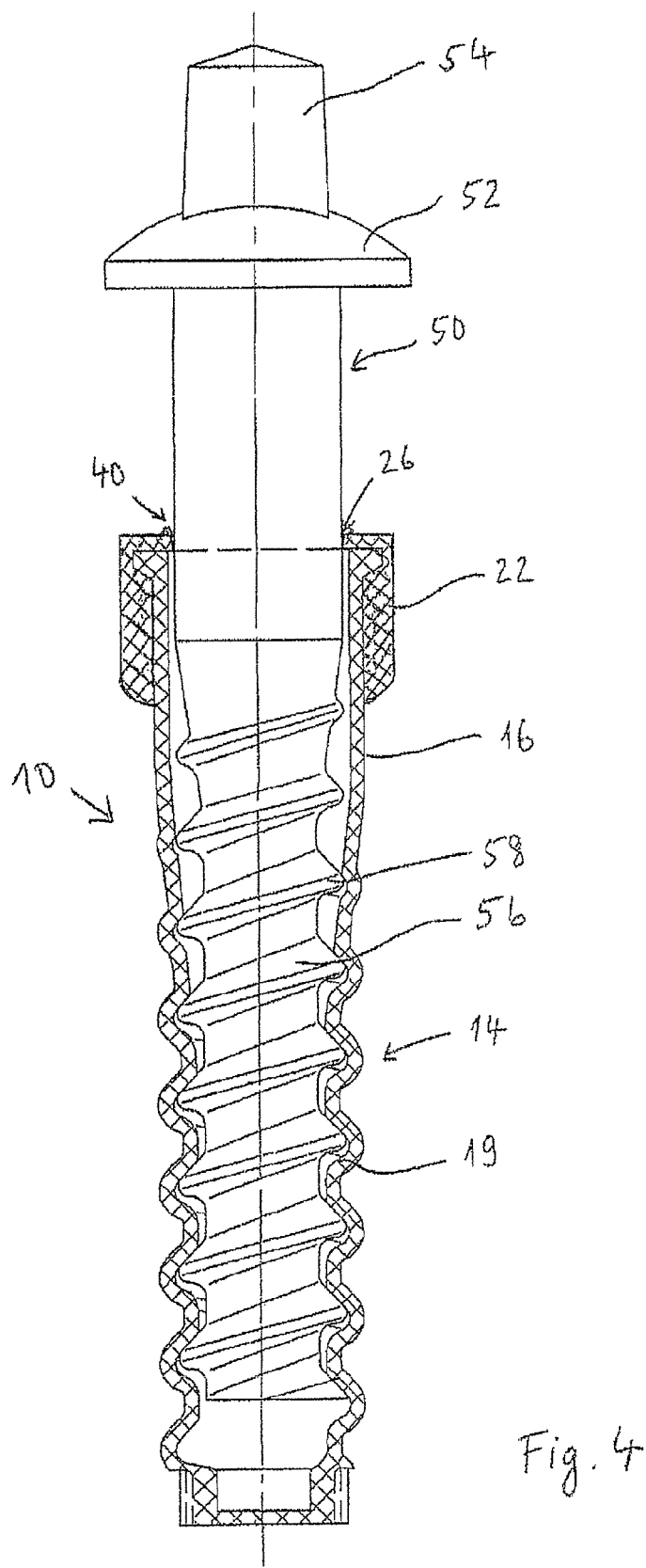

The distance between screw thread and anchor is produced in the embodiment shown in FIG. 4 by the screw thread being essentially cylindrically shaped but the surrounding anchor being widened.

Figure 5:
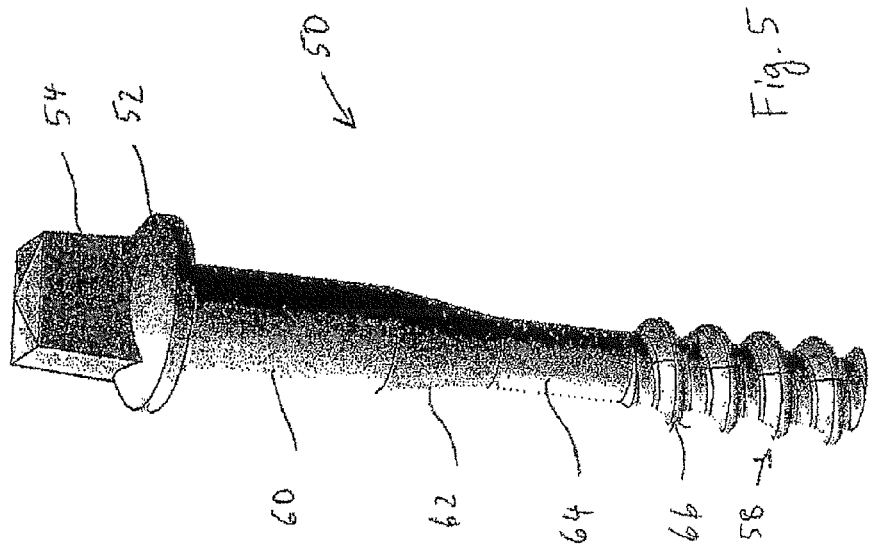
FIG. 5 is an alternative configuration of a rail screw for using with a screw anchor according to the invention.

However, in an alternative to this arrangement, the rail screw can also be designed such that the thread is only provided in a specific region of the rail screw, as a result of which the force engagement between rail screw and anchor can likewise be displaced into the deeper anchor region. The rail screw shown in FIG. 5 shows an example of this and has several sections. A first cylindrically-shaped section 60 follows on from the screw head 52 and has no external thread. The first section 60 passes through an intermediate section 62 to a second section 64, which is also cylindrically shaped but has thread elevations 66 in regions of the external thread 58. If the receiving anchor for the rail screw 50 shown in FIG. 5 is suitably shaped then it becomes clear that the threads 66 engage only in the lower region of the anchor into a corresponding internal thread of the anchor while the first section 60 abuts a smooth wall, i.e. one not provided with an internal thread, of the anchor. This measure also serves to displace the force engagement into the deeper region of the anchor and thus of the surrounding tie or non-ballasted track. Common to all embodiments is a sealing upwards and inwards due to the configuration of the anchor, as a result of which the electrical resistance of the rail attachment system is increased. Furthermore, by providing an elastic skirt, the external anchor shank is encircled thus allowing a reduction in stress to be achieved in the concrete tie in the anchor region. A further reduction in stress in the concrete tie or non-ballasted track in the anchor region can be achieved by the displacement illustrated in two examples of the force engagement between rail screw and anchor into a region more distant from the surface.

The invention claimed is:

1. A screw anchor for a concrete attachment into a railroad tie or non-ballasted track and a force-fit connection by means of a rail screw comprising:
   a threaded section with external threads with thread pitch disposed on an exterior of the screw anchor and internal threads with thread pitch disposed inside the screw anchor, and
   an upper partial section without external threads which is disposed in a mounted state close to an anchor opening of the screw anchor and wherein an upper end surface of the upper partial section is flush with an upper side of the rail road tie or non-ballasted track in the mounted state;
characterized in that
   a material with high elasticity is disposed on or around the upper partial section, wherein said material when in the mounted state under a radial pressure forms a projecting elevation which extends in an upward direction over the upper surface of the upper partial section and thereby also over the upper side of the railroad tie or non-ballasted track and forms an upstream barrier for water collected on an upper side of the tie or non-ballasted track, and reduces a free opening section of an inner chamber of the upper partial section so that a configuration of the anchor forms a seal upwards and inwards.

2. The screw anchor according to claim 1, characterized in that the material with high elasticity comprises a separate component, which is attached to the upper partial section.

3. The screw anchor according to claim 2, characterized in that the separate component has a dovetail-shaped lug which engages positively into an annular groove on the upper partial section.

4. The screw anchor according to claim 2, characterized in that the separate component is fitted onto the upper partial section.

5. The screw anchor according to claim 1, characterized in that the material with high elasticity is extruded on the upper partial section.

6. The screw anchor according to claim 1, characterized in that the external thread comprises a round thread.

7. The screw anchor according to claim 1 further comprising at least one positive fit element provided longitudinally on an outside of the screw anchor.

8. The screw anchor according to claim 1, characterized in that the material with high elasticity is additionally disposed as a pliable sheathing on an external circumference of the upper partial section.

9. A railroad tie or non-ballasted track comprising the screw anchor according to claim 1.

10. The railroad tie or non-ballasted track according to claim 9, further comprising a rail screw which possesses a cylindrically-shaped section having an external thread, wherein the screw anchor has a cone-shaped region widening towards an insertion opening.

11. The railroad tie or non-ballasted track according to claim 9, further comprising a rail screw which possesses a first cylindrical section and a second cylindrical section, wherein the first cylindrical section is disposed closer to the screw head than the second cylindrical section and has a larger minor diameter than the second cylindrical section; and only the second cylindrical section has an external thread.

12. The screw anchor of claim 7 wherein the one positive fit element is provided in the form of several ridges.

13. A screw anchor for a concrete attachment into a railroad tie or non-ballasted track and a force-fit connection by means of a rail screw comprising:

a threaded section with external threads with thread pitch disposed on an exterior of the screw anchor and internal threads with thread pitch disposed inside the screw anchor, and an upper partial section without external threads which is disposed in a mounted state close to an anchor opening; characterized in that a material with high elasticity is disposed on or around the upper partial section, wherein said material when in the mounted state under a radial pressure forms a projecting elevation which extends in an upward direction over an upper side of an end surface of the upper partial section and forms an upstream barrier for water collected on an upper side of the tie or non-ballasted track, and reduces a free opening section of an inner chamber of the upper partial section so that a configuration of the anchor forms a seal upwards and inwards and wherein said material with high elasticity radially extends inwardly past an inner wall of the upper partial section.

14. The screw anchor according to claim 13, characterized in that the material with high elasticity comprises a separate component, which is attached to the upper partial section.

15. The screw anchor according to claim 14, characterized in that the separate component has a dovetail-shaped lug which engages positively into an annular groove on the upper partial section.

16. The screw anchor according to claim 14, characterized in that the separate component is fitted onto the upper partial section.

17. The screw anchor according to claim 13, characterized in that the material with high elasticity is extruded on the upper partial section.

18. The screw anchor according to claim 13 further comprising at least one positive fit element provided longitudinally on an outside of the screw anchor.

19. The screw anchor according to claim 13, characterized in that the material with high elasticity is additionally disposed as a pliable sheathing on an external circumference of the upper partial section.

20. A railroad tie or non-ballasted track comprising the screw anchor according to claim 13.

\* \* \* \* \*